3,050,488
COMPOSITION COMPRISING POLYACRYLONITRILE PLASTICIZED WITH CYANOALKYL SULFONAMIDE

Paul R. Graham, Richmond Heights, Mo., assignor to Monsanto Chemical Company, St. Louis, Mo., a corporation of Delaware
No Drawing. Filed Jan. 2, 1958, Ser. No. 706,551
4 Claims. (Cl. 260—30.8)

This invention relates to new and useful acrylonitrile polymer compositions. More particularly, this invention relates to plasticized compositions comprising an acrylonitrile polymer and an N,N-bis(cyanoalkyl) arylsulfonamide.

The present invention is based on the discovery that N,N-bis(cyanoalkyl) arylsulfonamides or mixtures thereof effectively plasticize acrylonitrile polymerization products, so that the latter may be more easily shaped, as for example, by extrusion or molding, into useful articles of manufacture. The N,N-bis(cyanoalkyl) arylsulfonamides employed in practicing this invention may be used as a fugitive or temporary plasticizer, i.e., a plasticizer which is subsequently removed from the polymerization product, as for example, by solvent extraction of the plasticizer from the shaped article after the shaping process has been completed, or as a permanent plasticizer which is permitted to remain in the shaped polymerization product.

The N,N-bis(cyanoalkyl) arylsulfonamides used in the practice of the present invention are represented by the formula:

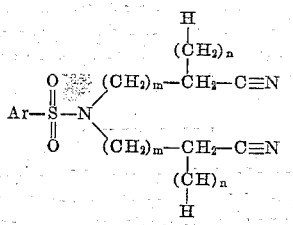

wherein $m$ is an integer of from 0 to 2 and $n$ is an integer of from 0 to 2, provided that when $m$ is 0, then $n$ is 0, and Ar is an aryl hydrocarbon radical having up to 15 carbon atoms, e.g., phenyl, tolyl, xylyl, cumyl, cymyl, xenyl, naphthyl, and the like. It is preferred that the aryl hydrocarbon radical be an aryl radical having up to 9 carbon atoms, e.g., phenyl, and lower alkyl-substituted phenyl radicals. N,N-bis(2-cyanoethyl)-O-toluenesulfonamide is particularly preferred.

Specific examples of compounds coming within the scope of the above broad definition are: N,N-bis(2-cyanoethyl) benzenesulfonamide, N,N-bis(2-cyanoisopropyl) - O - toluenesulfonamide, N,N - bis(2 - cyanoethyl) xylenesulfonamide, N,N-bis(cyanomethyl) cumenesulfonamide, N-2-cyanoethyl-N-cyanomethyl toluenesulfonamide, N,N - bis(2 - cyanoethyl) biphenylsulfonamide, N,N - bis(2 - cyanoethyl) - beta - naphthalenesulfonamide, N,N - bis(2 - cyanoethyl) - 2,3,6 - trimethylbenzenesulfonamide, N,N - bis(2 - cyanoethyl) isopropylbiphenylsulfonamide, N,N - bis(cyanomethyl cymenesulfonamide, N,N-bis(2 - cyanoethyl) - 2,3,6 - trimethylbenzenesulfonamide, N,N - bis(2 - cyanobutyl) toluenesulfonamide, etc.

The N,N-bis(cyanoalkyl) arylsulfonamides may be prepared by numerous methods known to those skilled in the art of chemical synthesis, as are disclosed and discussed in prior patents and in the literature. For example, these compounds may be prepared by the reaction of an arylsulfonyl chloride with the appropriate N,N-bis(cyanoalkyl) amine, according to the method of Bruson et al., J.A.C.S. 70, 214–17 (1948). The bis(2-cyanoethyl), bis(2-cyanoisopropyl) and bis(2-cyanoisobutyl) derivatives may be prepared also by the reaction of an aryl sulfonamide with acrylonitrile, methacrylonitrile and ethacrylonitrile, respectively. This latter method is disclosed in the patent to Bruson et al., U.S. 2,349,405.

The N,N-bis(cyanoalkyl) arylsulfonamide may be admixed with the acrylonitrile by a wide variety of procedures. Thusly, the polymer in granular form may be mixed with the N,N-bis(cyanoalkyl) arylsulfonamide or in aqueous or organic solutions or dispersions of either or mixtures thereof. It is preferred, however, to use any of the well-known organic solvents for the acrylonitrile polymers, in the presence of which the intimate dispersing of the N,N-bis(cyanoalkyl) arylsulfonamide and the acrylonitrile polymer is more readily effected. The nature of the solvent, which is useful in dissolving or softening the acrylonitrile polymer, will to a large extent depend upon the composition of the acrylonitrile polymer and its chemical reactivity with respect to the N,N-bis(cyanoalkyl) arylsulfonamide. Any of the well-known solvents for acrylonitrile polymers may be employed, provided such is a solvent for and is chemically inert with respect to the N,N-bis(cyanoalkyl) arylsulfonamide. Typical of such solvents are dimethyl formamide, dimethyl acetamide, tetrahydropyran, tetrahydrofuran, morpholine, various organophosphonates, ethylene carbonate, various sulfones, etc. Of these well-known solvents, N,N-dimethyl formamide is preferred.

Employing conventional techniques, such solutions or dispersions, upon extruding, casting, etc., into a medium which removes the solvent from the solution, yield a precipitate containing a homogeneous mixture of the acrylonitrile polymer and the N,N-bis(cyanoalkyl) arylsulfonamide, from which may be formed films, sheets, fibers and other articles, which are characterized by excellent chemical and physical properties, particularly with respect to flexibility.

The acrylonitrile polymers which may be used in the compositions of this invention are polyacrylonitrile, copolymers of acrylonitrile with minor proportions of other mono-olfinic compounds copolymerizable therewith, and mixtures of acrylonitrile polymers with other polymeric compositions, including olefinic polymers, or other types of polymeric substances. These mixtures, or blended polymeric compositions, are especially useful for the purpose of developing dye-receptive polymers, for example, by blending non-dyeable acrylonitrile polymers with a minor proportion of a polymer chemically reactive with dyestuff. In general, there is a minimum proportion of acrylonitrile, which should be present in polymeric form in order to have adequate tensile properties in the fibers prepared therefrom. Thus, a polymer of a monomeric mixture of which acrylonitrile is at least 75 percent of the polymerizable content is useful in the practice of this invention. Acrylonitrile polymers other than polyacrylonitrile, which are preferred for use in the practice of this invention, are the copolymers of 85 or more percent of acrylonitrile and one or more other mono-olefinic monomers.

Illustrative examples of monomers which may be copolymerized with acrylonitrile to yield a polymerization product containing in the polymer molecules an average of at least 75 percent by weight of acrylonitrile are compounds containing a single $CH_2=C<$ grouping, for instance, the vinyl esters and especially the vinyl esters of monocarboxylic acids, e.g., vinyl acetate, vinyl propionate, vinyl butyrate, vinyl chloroacetate, etc.; vinyl and vinylidene halides, e.g., the vinyl and vinylidene chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl, acetates, chloroacetates, laurates, cyanides, etc.; acrylic and alkacrylic acids, (e.g., methacrylic, ethacrylic, etc.) and esters and amides of such acids (e.g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; styrene and other vinyl-substituted aromatic hydrocarbons, e.g., o-methyl styrene, p-methyl styrene, etc.; vinyl pyridines, such as alpha-vinyl pyridine and other vinyl-substituted heterocyclic nitrogen ring compounds, as, for example, the alkyl-substituted vinyl pyridines, etc.; unsaturated aliphatic hydrocarbons containing a single $CH_2=C<$ group, e.g., isobutylene, etc.; and numerous other vinyl, acrylic and other compounds containing a single $CH_2=C<$ grouping which are copolymerizable with acrylonitrile to yield thermoplastic polymers. The alpha,beta-unsaturated dicarboxylic acids, their anhydrides, and alkyl and dialkyl esters may also be copolymerized with acrylonitrile to form copolymers which are useful in practicing the present invention, e.g., maleic acid, maleic anhydride, fumaric acid, dibutyl maleate, butyl acid maleate, citraconic acid, citraconic anhydride, etc.

Any suitable method of polymerizing the monomeric acrylonitrile or mixture of monomers may be employed. One method comprises polymerizing the monomeric acrylonitrile or mixture of monomers in an aqueous emulsion using a suitable polymerization catalyst, e.g., ammonium persulfate. It is desirable that the polymers be uniform with respect to molecular weight, particle size and chemical composition. In general, the molecular weight should be in excess of 10,000, and preferably in excess of 25,000, the molecular weights being determined by measuring the viscosity of dilute solutions in the manner well known in the art. Generally, those polymers having a molecular weight between 40,000 and 250,000 are preferred.

The proportions of acrylonitrile polymerization product and N,N-bis(cyanoalkyl) arylsulfonamide in the compositions of this invention may be varied widely, depending upon the particular use for which the composition is intended. For some applications, e.g., where the plasticizer is intended to be permanent, and the plasticized composition will not come into contact with a solvent for the plasticizer mixture, the latter may constitute 50% or more by weight of the composition. In other applications, e.g., where the plasticized composition is to be extruded through an orifice to form filaments (mono- or multi-filaments), the acrylonitrile polymerization product is generally mixed with a plasticizing amount not substantially exceeding 30% by weight of the composition. The minimum quantity is that which imparts a definite plasticizing effect, and is usually at least about 10% by weight of the composition. For most applications, amounts of plasticizer in the range of from about 20% to about 60% by weight of the composition will be found to suffice and, thus, this plasticizer concentration range constitutes a preferred aspect of this invention.

In the preferred practice of this invention, acrylonitrile polymer solutions are prepared by dispersing the finely divided polymers and the N,N-bis(cyanoalkyl) arylsulfonamide in an inert organic solvent for the components, followed by heating with stirring, tumbling or other agitation until a free-flowing homogeneous solution or dispersion is obtained. It is desirable to use a solution or dispersion of as high a concentration as possible of acrylonitrile polymer, but the maximum concentration will be dependent upon the molecular weight of the polymer and the viscosity characteristics of the mixture. To obtain fibers or films of optimum physical properties, acrylonitrile polymers of molecular weights in excess of 25,000 are used. While as little as 5% of the polymer can be used in a spinning or casting solution, such low concentrations are undesirable because they necessitate the removal of too much solvent from the extruded solution, thereby increasing solvent recovery cost. The concentration of polymer in the spinning or casting solution is usually between 8 and 35%, but concentrations above 35% are also contemplated. The concentration of the polymer will ultimately be determined by considering the desired physical properties of the fiber or film. The viscosity will depend upon the chemical composition and molecular weight of the polymer, and the optimum concentration can best be determined by selecting a uniform high molecular weight polymer having good fiber-forming or film-forming properties and having as small an amount of solvent as possible to form a viscous solution capable of being spun or cast at convenient temperatures to provide a finished flexible fiber or film.

It is not understood whether a chemical reaction is involved between the N,N-bis(cyanoalkyl) arylsulfonamide and the arcrylonitrile polymer, or whether the presence of the said arylsulfonamide effects a reorientation of the acrylonitrile polymer. In this regard, it is to be understood that the instant invention is not limited to any physical or chemical change, but is directed broadly to the product obtained by admixing the said arylsulfonamide with an acrylonitrile polymer and processing said composition under such conditions which ultimately provide for a flexible shaped article.

In order that those skilled in the art may understand how the present invention can be carried into effect, the following examples are given by way of illustration, and not by way of limitation. All parts are parts by weight.

EXAMPLE 1

Plasticized acrylonitrile compositions are prepared by adding, in the weight proportions set forth in Table A below, the N,N-bis(2-cyanoethyl) arylsulfonamide to a 10% solution of homopolymeric polyacrylonitrile dissolved in dimethyl formamide, the latter being at room temperature (approximately 25° C.). The mixture is then stirred and heated until a clear, viscous solution results. The solution is poured on a glass plate, cast and the solvent evaporated by placing the coated glass plate in an oven maintained at a temperature of 80° C. The resultant film, which is about 5 mils thick, is then peeled from the glass plate and subjected to various tests which indicate the physical properties of the film. The results of these tests are reported in Table B below.

*Table A*

FORMULATIONS

|  | 1 | 2 | 3 |
|---|---|---|---|
| Polyacrylonitrile | 100 | 100 | 100 |
| N,N-bis(2-cyanoethyl)-o-toluene sulfonamide |  | 50 | 100 |

Table B

PHYSICAL PROPERTIES OF FILM

| | 1 | 2 | 3 |
|---|---|---|---|
| Volatility, percent Plast. lost (ASTM-Method D-1203-52T). | 0 | 7.1 | |
| $H_2O$ Extraction, percent Plast. lost (ASTM-Method D-1239-52T). | 0 | 21.6 | |
| Heat Stability [1] (Minutes at 170° C. before embrittlement occurs). | 20 | | 120 |

[1] The embrittlement time is designated as the time when the specimen cracks when it is folded back upon itself and creased.

Film samples were prepared according to the method described above which contained 50 and 100 parts per hundred parts of resin of the following conventional plasticizers for polyacrylonitrile: succinonitrile, adiponitrile and glycerine carbonate. These film samples, along with the film samples of Example I (Formulations 1, 2 and 3) were aged for a period of two years in a laboratory which had an average relative humidity of 50% and an average temperature of 23° C. The films plasticized with N,N-bis(2-cyanoethyl)-o-toluenesulfonamide (Formulations 2 and 3 above) remained completely flexible, whereas the unplasticized film (Formulation 1) and the films plasticized with the above described conventional plasticizers were extremely brittle.

EXAMPLE 2

Example 1 is repeated, except that the proportion of plasticizer is varied so as to produce compositions containing 10%, 25%, 40% and 60% by weight of N,N-bis(2-cyanoethyl)-o-toluenesulfonamide, based on the total weight of the sulfonamide and the polyacrylonitrile. Similar results are obtained, in that the film containing the higher percentage of the plasticizer exhibits lower tensile strength and modulus and properties, and higher elongation, $H_2O$ extraction, heat stability and volatility properties; whereas the reverse is true of the compositions containing lower amounts of plasticizer.

EXAMPLE 3

Example 1 is repeated but using, in place of the homopolymeric acrylonitrile, the following copolymers of acrylonitrile in the individual tests:

Copolymer produced from a mixture of:
(1) 98% acrylonitrile and 2% vinyl acetate
(2) 95% acrylonitrile and 5% alpha-vinyl pyridine
(3) 95% acrylonitrile and 5% vinyl acetate
(4) 85% acrylonitrile and 15% methyl methacrylate
(5) 95% acrylonitrile and 5% acrylic acid
(6) 90% acrylonitrile and 10% dibutyl maleate
(7) 85% acrylonitrile and 7.5% methyl acrylate and 7.5% 2-methyl-5-vinylpyridine
(8) Acrylonitrile and 2% styrene
(9) 90% acrylonitrile and 10% hydroxyethyl methacrylate
(10) 75% acrylonitrile and 12.5% methylmethacrylate and 12.5% vinyl acetate
(11) 79% acrylonitrile and 21% methacrylic acid
(12) 85% acrylonitrile and 15% methacrylic acid
(13) 80% acrylonitrile, 10% methyl acrylate and 10% vinyl acetate
(14) 90% acrylonitrile and 10% vinyl butyrate
(15) 90% acrylonitrile and 10% vinylidene chloride In each case, the plasticizer (of Formulations 2 and 3 of Example 1 above) exerts a definite plasticizing effect on the acrylonitrile copolymer, in that the N,N-bis(2-cyanoethyl)-o-toluenesulfonamide is compatible with the acrylonitrile copolymer in each case and that the plasticized films are more flexible than the free copolymers.

EXAMPLE 4

Example 1 is repeated using, in place of the N,N-dicyanotoluenesulfonamide, 50 parts per 100 parts of polyacrylonitrile of the following N,N-bis(cyanoalkyl) arylsulfonamides:

(1) N,N-bis(cyanomethyl) toluenesulfonamide
(2) N,N-bis(cyanomethyl) benzenesulfonamide
(3) N,N-bis(cyanomethyl) - 2 - isopropylbenzenesulfonamide
(4) N,N-bis(2-cyanoethyl)-p-toluenesulfonamide
(5) bis(2-cyanoethyl)benzenesulfonamide
(6) N,N-bis(2-cyanoisopropyl)-o-toluenesulfonamide
(7) N,N-bis(2-cyanoisobutyl)-o-toluenesulfonamide
(8) N,N-bis(2-cyanoethyl)-p-ethylbenzenesulfonamide
(9) N,N-bis(2-cyanoethyl) - 2,6 - dimethylbenzenesulfonamide
(10) N,N - bis(2-cyanoethyl) - 2,3,5 - trimethylbenzenesulfonamide
(11) N - cyanoethyl - N - cyanopropyl - o - toluenesulfonamide
(12) N - cyanoisopropyl - N - cyanomethyl-o-toluenesulfonamide In each case, the particular arylsulfonamide used exerts a definite plasticizing effect on the homopolymer of acrylonitrile, in that they are all compatible with the polyacrylonitrile and that the compounded films are more flexible than the control.

From the foregoing description, it will be seen that the present invention provides compositions comprising (1) an acrylonitrile polymerization product containing, in the polymer molecules thereof, an average of at least 75% by weight of acrylonitrile, and (2) an N,N-bis(cyanoalkyl) arylsulfonamide, in an amount sufficient to plasticize the acrylonitrile polymerization product. These compositions can be shaped or fabricated, as by extrusion, molding, casting (from a solution thereof), etc., into a wide variety of useful articles. Lubricants, antistatic agents, stabilizers and other conventional modifiers of acrylonitrile polymerization products can be incorporated therein at any suitable stage of the operation. Although not limited thereto, the compositions of this invention are particularly useful in the production of filaments, threads, yarns, films, foils, strands, etc., which thereafter can be woven into fabrics; in the production of molding compositions and molded articles; and also as solvent resistant gasketing materials.

While this invention has been described with respect to certain embodiments, it is not so limited, and it is to be understood that variations and modifications thereof which are obvious to those skilled in the art may be made without departing from the spirit or scope of the invention.

What is claimed is:

1. A composition comprising a homopolymer of acrylonitrile and from about 10% to about 60% by weight of the composition of a compound of the structure

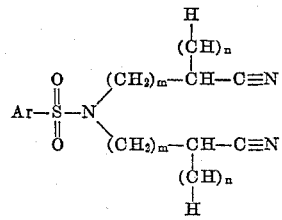

wherein $m$ is an integer of from 0 to 2 and $n$ is an integer of from 0 to 2, provided that when $m$ is 0, then $n$ is 0, and Ar is an aryl hydrocarbon radical having up to 15 carbon atoms.

2. A composition comprising a homopolymer of acrylonitrile having an average molecular weight within the range of from 40,000 to 250,000 and from about 20% to about 60% by weight of the composition of a compound of the structure

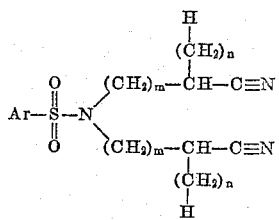

wherein $m$ is an integer of from 0 to 2 and $n$ is an integer of from 0 to 2, provided that when $m$ is 0, then $n$ is 0, and Ar is an aryl hydrocarbon radical having up to 9 carbon atoms.

3. A composition comprising a homopolymer of acrylonitrile having an average molecular weight of from 40,000 to 250,000 and from about 20% to about 60% by weight of the composition of N,N-bis(2-cyanoethyl)toluenesulfonamide.

4. A composition comprising a homopolymer of acrylonitrile having an average molecular weight of from 40,000 to 250,000 and from about 20% to about 60% by weight of N,N-bis(2-cyanoethyl)-o-toluenesulfonamide.

References Cited in the file of this patent

UNITED STATES PATENTS

| | | |
|---|---|---|
| 2,349,405 | Bruson et al. | May 23, 1944 |
| 2,855,375 | Dobay | Oct. 7, 1958 |